(12) United States Patent
Cinausero et al.

(10) Patent No.: US 10,364,014 B2
(45) Date of Patent: Jul. 30, 2019

(54) MULTILAYER FLOOR COVERING

(71) Applicant: GERFLOR, Villeurbanne (FR)

(72) Inventors: Nicolas Cinausero, Collonges-au-Mont-D'or (FR); Thomas Gillot, Lyons (FR)

(73) Assignee: GERFLOR, Villeurbanne (FR)

( * ) Notice: Subject to any disclaimer, the term of this patent is extended or adjusted under 35 U.S.C. 154(b) by 307 days.

(21) Appl. No.: 15/059,510

(22) Filed: Mar. 3, 2016

(65) Prior Publication Data
US 2016/0257395 A1    Sep. 8, 2016

(30) Foreign Application Priority Data

Mar. 6, 2015 (FR) ..................... 15 51924

(51) Int. Cl.
| | | |
|---|---|---|
| *B32B 3/10* | (2006.01) | |
| *B64C 1/18* | (2006.01) | |
| *B32B 5/02* | (2006.01) | |
| *B32B 27/08* | (2006.01) | |
| *B32B 27/12* | (2006.01) | |
| *B32B 27/30* | (2006.01) | |
| *B32B 27/36* | (2006.01) | |
| *B32B 27/40* | (2006.01) | |
| *B32B 27/18* | (2006.01) | |

(52) U.S. Cl.
CPC ............. *B64C 1/18* (2013.01); *B32B 5/022* (2013.01); *B32B 5/024* (2013.01); *B32B 27/08* (2013.01); *B32B 27/12* (2013.01); *B32B 27/18* (2013.01); *B32B 27/304* (2013.01); *B32B 27/306* (2013.01); *B32B 27/36* (2013.01); *B32B 27/40* (2013.01); *B32B 2255/00* (2013.01); *B32B 2260/021* (2013.01); *B32B 2260/046* (2013.01); *B32B 2262/101* (2013.01); *B32B 2307/4023* (2013.01); *B32B 2307/546* (2013.01); *B32B 2471/00* (2013.01); *B32B 2605/003* (2013.01); *B32B 2605/18* (2013.01)

(58) Field of Classification Search
None
See application file for complete search history.

(56) References Cited

U.S. PATENT DOCUMENTS

2002/0136862 A1* 9/2002 Dong ............... B32B 21/08
428/150
2010/0227132 A1    9/2010 Pierson et al.

FOREIGN PATENT DOCUMENTS

EP    2182135 A1    5/2010

OTHER PUBLICATIONS

Search Report issued in French Pat. Appl. No. 1551924 dated Oct. 15, 2015.
Written Opinion issued in French Pat. Appl. No. 1551924 dated Oct. 15, 2015.

* cited by examiner

*Primary Examiner* — Christopher M Polley
(74) *Attorney, Agent, or Firm* — Marshall, Gerstein & Borun LLP

(57) ABSTRACT

A multilayer floor covering includes a layer A of reinforcing fibers, an adhesive layer B, an underside layer C, a reinforcing layer D, free of reinforcing fibers, made of thermoplastic polymer chosen from the group comprising polyester resins, acrylic resins and mixtures thereof, and a surface layer E.

17 Claims, 1 Drawing Sheet

MULTILAYER FLOOR COVERING

CROSS-REFERENCE TO RELATED APPLICATIONS

This application claims the benefit of priority under 35 U.S.C. § 119 of French Patent Application No. 1551924, filed Mar. 6, 2015, the entire content of which is hereby incorporated herein by reference, in its entirety.

TECHNOLOGICAL FIELD

The present description relates to a multilayer intended to be used as a floor covering in particular in vehicles transporting people, for example in the aeronautics field.

BACKGROUND OF THE DISCLOSURE

In fields such as aeronautics, major companies are constantly looking for new materials that will reduce costs.

As an example, it can involve the optimization of the operation of aircraft by developing and using new materials which have satisfactory physical properties while being lighter than conventional materials. A reduction in fuel consumption therefore results in a reduction in an aircraft's operating costs.

Since this type of improvement may be directed towards any kind of part, specific attention has been given to floor coverings.

In general, a floor covering is made up of a plurality of layers that are assembled together. In particular an aeronautic floor covering can be made up of a strengthening layer which assures the rigidity of the product. This property of rigidity constitutes an important criterion in the aeronautics industry. Furthermore, a surface layer contributes in particular properties of wear resistance, abrasion resistance, or slip resistance. The function of the surface layer can also be to protect a possibly printed layer upon which designs can be printed.

Some amount of rigidity is generally required in a floor covering in order to limit unsightly deformations to floor coverings which can occur during flight (the effect of buckling or "waving", formation of trapped air bubbles under the covering or "bubbling"). Additionally, a rigid floor covering also limits telegraphing: a phenomenon that is independent of the area of application which shows up as the passing of irregularities within the substrate through to the floor covering.

The rigidity of conventional coverings can be optimized by the use of two superimposed layers made of resin-impregnated reinforcing fibers. However, these reinforcing layers add considerable weight to the floor covering in particular because of the presence of reinforcement fibers, for example fiberglass.

Furthermore, the possible incompatibility of the resin used in these reinforcing layers with other product layers often requires the presence of intermediate adhesive layers or primer layers that provide an interface. Not only can these additional layers make the multilayer heavier but they can also render the method of production thereof more complex. In fact, the process for assembling the layers constituting a synthetic floor covering represents a major portion of the overall production cost of a product and in particular the number of layers assembled and the presence of adhesives or primers that are necessary for providing adhesion between the various layers of different chemical types.

However well this type of floor covering is adapted to the aeronautics field, there is nonetheless a need to improve the features thereof, in particular the weight, whilst also maintaining satisfactory rigidity.

The Applicant has developed a multilayer floor covering with which to resolve this technical problem. This multilayer has rigidity properties that limit undesirable deformations of the floor covering due to buckling, trapped air bubbles or telegraphing (the transmission of floor irregularities to the floor covering).

SUMMARY OF THE DISCLOSURE

The present description relates to a multilayer floor covering containing two strengthening layers wherein one of them is free of reinforcing fibers.

Advantageously, this multilayer has a surface density (mass per unit area) that is less than that of conventional coverings while at the same time providing sufficient rigidity for applications within the technical areas of aeronautics.

A multilayer floor covering includes a layer A of reinforcing fibers; an adhesive layer B; an underside layer C; a reinforcing layer D, free of reinforcing fibers, made of a thermoplastic polymer chosen from the group comprising polyester resins, acrylic resins and mixtures thereof; and a surface layer E.

Various embodiments of described herein provide the following advantages:
 reduce the number of production processing steps;
 reduce the surface density by reducing the number of layers required;
 reduce the surface density by making use of a second reinforcement layer that is lighter than conventional fiber reinforcements;
 reduce the surface density by making use of the dual purpose reinforcement/printing medium layer.

In light of the properties thereof, the multilayer according to the present disclosure is more specifically attractive for applications for which the surface density of the covering is of primary importance, as in the aeronautic field.

The described embodiments and the advantages which follow therefrom will be better seen from the figures and examples provided without limitation.

DETAILED DESCRIPTION

Figure 1:
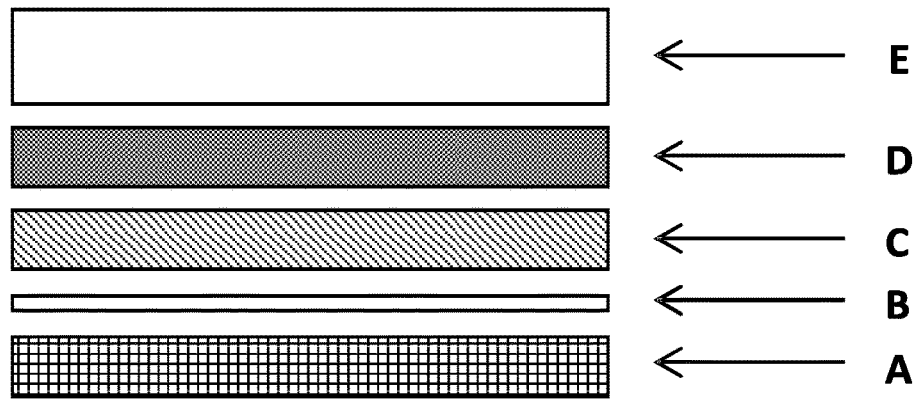
FIG. 1 is a section view according to a specific embodiment in accordance with the present disclosure.

An embodiment of a multilayer floor covering includes a layer A of reinforcing fibers; an adhesive layer B; an underside layer C; a reinforcing layer D, free of reinforcing fibers, made of a thermoplastic polymer chosen from the group comprising polyester resins, acrylic resins and mixtures thereof; and a surface layer E.

Advantageously, in this multilayer, the reinforcing layer D has a thickness ranging from between 0.07 mm and 0.40 mm, and advantageously a surface density ranging from between 50 and 500 g/m².

It involves a multilayer comprising a composite laminate (layer A of reinforcing fibers) and a polymeric surface complex (layers C, D and E).

Advantageously, the multilayer includes, successively, the layers A, B, C, D and E.

In general, a layer includes two main sides corresponding to an upper side and a lower side.

The reinforcing layer A corresponds to the lowest layer of the multilayer. It is intended to be in contact with the floor upon which the covering is installed. It can thus rest on the floor panel of an aircraft; the layer A/panel interface can be provided by means of an adhesive.

It involves a layer comprising fibers which can be woven or nonwoven.

Layer A can be composed of a composite material comprising woven or nonwoven reinforcing fibers and a thermosetting or thermoplastic polymer resin.

Advantageously, layer A comprises, by weight relative to the weight of said layer A:

20 to 80% reinforcing fibers, more advantageously 45 to 60%;

20 to 80% polymer resin, more advantageously 40 to 55%.

The reinforcing fibers contribute to the rigidification of layer A. They can be inorganic or organic. In particular, it can be a matter of natural or synthetic fibers providing reinforcing within a material. Preferably it involves fibers of a material chosen from the group comprising: glass, carbon, aramid, linen and hemp.

The polymer resin for layer A can in particular be a thermosetting or thermoplastic polymer chosen from among the group comprising: polyester resin, phenolic resin, epoxy resin, polysulfone, vinylester resin, epoxy-acrylic resin and mixtures thereof.

The reinforcing fibers for layer A can be in the form of woven or nonwoven fibers.

According to a particular embodiment, layer A can be constituted of woven fiberglass covered with a thermosetting polymer resin.

The surface density of layer A can in particular range from between 200 and 1,200 $g/m^2$ and more advantageously of between 300 and 600 $g/m^2$.

Additionally, layer A advantageously has a thickness ranging from between 0.05 and 1.5 mm and more advantageously between 0.2 and 0.4 mm.

Layer A is intended to be in contact with the flooring, for example of an aircraft, upon which the multilayer is placed. It is rendered rigidly connected to layer C by adhesive layer B.

Typically, adhesive layer B can in particular be a polymer chosen from the group comprising copolyamides (CoPA), thermoplastic polyurethane (TPU), ethylene-vinyl acetate (EVA), copolyesters and mixtures thereof.

The surface density of layer B can in particular range from between 10 and 140 $g/m^2$ and more advantageously between 40 and 100 $g/m^2$.

Additionally, layer B advantageously has a thickness ranging from between 0.02 and 0.50 mm and more advantageously between 0.04 and 0.12 mm.

As already indicated, layer B serves to connect layers A and C. In fact, the resins or polymers in layers A and C are often not very compatible in that the polymer resin from layer A, preferably chosen from the group of thermosetting resins, is generally not very compatible with the components of layer C advantageously thermoplastics.

In general, layer C contributes thickness to the floor covering. It also in particular serves to provide good weldability to the edges of the covering. In particular this is the case when the joints are applied to the product's margin in order to provide a seal for the floor covering on the edge.

The seal can be achieved by means of heat welding using a weld bead, or by using mastics. The good mechanical hold of the joint may depend not only upon the materials used but also on the contact surface, therefore in particular the thickness of the product. Finally, layer C serves to provide opacity when a printed layer is assembled thereon.

Layer C, called "intermediate layer" or "underside layer", is advantageously a polymer selected from the group comprising polyvinylchloride, ethylene-vinyl acetate copolymer and mixtures thereof.

Advantageously, layer C is polyvinylchloride (PVC).

Advantageously, layer C does not comprise polyurethane or thermoplastic polyurethane.

The surface density of layer C can in particular range from between 300 and 1300 $g/m^2$ and more advantageously between 600 and 1000 $g/m^2$.

Layer C advantageously has a thickness ranging from between 0.10 and 0.60 mm and more advantageously between 0.30 and 0.55 mm.

Layer C is positioned between layer B and layer D, and constitutes a second reinforcement.

As already indicated, the multilayer floor covering is distinguished from multilayers from the prior art in that the reinforcing layer D does not have any reinforcing fibers.

The reinforcing layer D is made of a thermoplastic polymer selected from the group comprising polyester resins, for example polyethylene terephthalate (PET) or polyethylene terephthalate glycol (PETG); acrylic resins, for example polymethylmethacrylate or polymethylacrylate; and mixtures thereof.

Advantageously, layer D comprises PET and/or PETG. PETG is an amorphous copolyester polymer having a different chemical structure than PET. In general, PETG has better processing properties, such as for example thermoformability.

The reinforcing layer D can also constitute a medium for printing a pattern or decoration for example. The layer D is then also a printing layer. In that way, the multilayer can have a printed pattern on layer D.

When layer D is also a printing layer, the pattern or decoration is printed on the upper side of layer D, meaning that the side of layer D which is facing layer E. Layer D then includes a printed pattern on the side thereof facing layer E.

The surface density of layer D can in particular be comprised between 50 and 500 $g/m^2$ and more advantageously between 100 and 300 $g/m^2$.

Additionally, layer D advantageously has thickness comprised between 0.07 and 0.40 mm and more advantageously between 0.10 and 0.20 mm.

Reinforcing layer D has specific properties serving to reduce the number of layers constituting the multilayer while also providing sufficient rigidity.

In fact, the integration of a reinforcing layer D, without reinforcing fibers, allows for the avoidance of not only a second adhesive layer providing adhesion thereof with the underside layer C but also with a possible printing layer since layer D can also play the role of the printing layer. This results in a reduction in the overall surface density of the multilayer.

This multilayer can in this way have a lower surface density than conventional coverings while also having the rigidity necessary for aeronautical floor covering applications.

According to a specific embodiment, layer C can also include fillers, in particular inorganic fillers, for example clays, silica, calcium carbonate, metal hydroxides (in particular aluminum or magnesium hydroxides) or metal oxides (in particular magnesium oxide or zinc oxide).

These fillers can represent 30 to 80% by weight compared to the weight of the layer C, advantageously 50 to 70% by weight, alternatively 40 to 60% by weight.

According to another specific embodiment, layer C can be the result of the assembly of two layers made from a single polymer, where one of the two layers contains more inorganic fillers than the other in order to reduce the cost of the final product.

As an example, layer C can be obtained by assembling a first layer comprising between 40 and 60% of the inorganic fillers by weight and a second layer comprising between 20 and 40% inorganic fillers by weight, the fillers representing 30 to 80% by weight relative to the resulting weight of layer C, advantageously 50 to 70% by weight and alternatively 40 to 60% by weight.

According to another specific embodiment, layer C may include an additive such as a plasticizer, a flame retardant such as aluminum trihydroxide, or pigments.

As an example, the plasticizer may be a phosphate ester type plasticizer. It can in particular be chosen from the group comprising DIDP (diisodecyl phthalate), DINP (diisononyl phthalate) and phosphate ester plasticizers.

This layer C additive may represent 10 to 30% by weight, compared to the weight of layer C, advantageously 12 to 18% by weight.

Layer D can also contain pigments, in particular $TiO_2$ for example in the case of a printable white film.

Advantageously the reinforcing layer D is composed of polymers with a bending modulus of elasticity ranging from between 1500 and 3,500 MPa, more advantageously between 2000 and 3200 MPa. This modulus is advantageously measured according to the ISO 178 standard.

Finally, the multilayer includes a surface layer E advantageously positioned upon layer D. This is a wear layer that has in particular the properties of stain resistance, slip resistance and abrasion resistance.

In practice the surface layer E includes a polymer chosen from the group comprising thermoplastic polyurethane, poly (vinylchloride), and mixtures thereof.

Preferably, the surface layer E comprises thermoplastic polyurethane.

The surface density of layer E can in particular be comprised between 150 and 600 $g/m^2$ and more advantageously between 200 and 400 $g/m^2$.

Additionally, layer E advantageously has thickness comprised between 0.1 and 0.70 mm and more advantageously between 0.20 and 0.45 mm.

Layer E may comprise fillers, flame retardants and pigments in such a way as to define a pattern or decoration which may or may not be uniform. On the other hand, when layer D is also a printing layer, layer E is transparent.

The reinforcing layer E can also constitute a medium for printing a pattern or decoration for example. Layer E is then also a printing layer. In that way, the multilayer can have a printed pattern on layer E.

When layer E is also a printing layer, the pattern or decoration is printed on the lower side of layer E, meaning the side of layer E which is facing layer D. Layer E then includes a printed pattern on the side thereof facing layer D.

Advantageously, layer E comprises between 10 and 20% by weight of flame retardant, in particular a phosphonate resin.

According to another specific embodiment, the multilayer may comprise a surface varnish, positioned upon layer E. This optional protective layer can serve to improve the scratch-resistance or stain-resistance properties of the product. Furthermore, it can also give the product more of a matte surface appearance, which can be desirable in some areas of application. It can in particular be based upon polyurethane or acrylic or mixtures thereof and advantageously have a mass ranging from between 5 and 50 $g/m^2$.

According to another specific embodiment, the multilayer may comprise at least one additional layer, free of reinforcing fibers.

Advantageously, the multilayer has a surface density that is less than or equal to 2.3 $kg/m^2$, more advantageously ranging from between 1,500 and 2,200 $g/m^2$ and still more advantageously between 1,800 and 2,000 $g/m^2$.

Advantageously, the multilayer has a thickness less than 3.7 mm, more advantageously ranging from between 1 and 2.5 mm, and still more advantageously comprised between 1.3 and 1.6 mm, in particular of the order of 1.4 mm.

According to an advantageous embodiment, the multilayer comprises at least one of the following layers:
  a layer A made of polyester and fiberglass, advantageously woven;
  an adhesive B made of thermoplastic polyurethane;
  a layer C made of polyvinylchloride (PVC), advantageously comprising at least some fillers and/or a flame retardant agent;
  a layer D made of PETG and/or PET;
  a layer E made of thermoplastic polyurethane, advantageously comprising at least one additive such as a flame retardant agent.

According to an advantageous embodiment, the multilayer comprises at least one of the following layers:
  a layer A made of phenolic resin and fiberglass, advantageously woven;
  an adhesive layer B made of copolyamide (CoPA);
  a layer C made of polyvinylchloride (PVC), advantageously comprising at least some fillers and/or a flame retardant agent;
  a layer D made of PETG and/or PET;
  a layer E made of thermoplastic polyurethane, advantageously comprising at least one additive such as a flame retardant agent.

According to another specific embodiment, the multilayer is constituted of layers A, B, C, D and E. In other words and according to this embodiment, it does not comprise other layers. In this case, it may nevertheless comprise a varnish covering layer E.

The presently described embodiments also relate to a method for the production of this multilayer. It includes in particular the following steps:
  production of layers A to E;
  assembly of layers A to E.

As an example, layer B can be produced by an extrusion blow molding process. Layer C may be produced by calendering, in particular when it is made of PVC. Layer E can be produced by conventional processing means for thermoplastics, meaning by extrusion calendering, extrusion blow molding or by calendering.

The layers A to E are advantageously assembled by superimposition under the action of increasing temperature and pressure by conventional lamination methods, such as lamination by heat-rolling, where steps of heating and pressing follow each other. In order to give a surface structure in the final phase, the multilayer can undergo a graining step.

The lamination consists of passing the preheated layers between two temperature-controlled rollers which exert pressure. These rollers perform the joining of the layers.

The thickness of the multilayer does not necessarily correspond to the sum of the thicknesses of the layers because of the joining and post-treatment steps: pressing and optional graining for example.

Advantageously the lamination temperatures range from between 100 and 160° C. As an example, the pressure exerted can vary from 8 to 20 bars, preferably from 10 to 15 bars.

In practice, the reinforcing layer D has good compatibility with the underside layer C. In this way, during the assembly of layers A to E, it is not necessary to insert an additional adhesive layer between them, or to apply a specific primer between the reinforcing layer D and the underside layer C, thus rendering production of the product easier.

In contrast, the multilayers from the prior art comprise two fiber reinforcements that may require additional adhesive or primer layers in order to provide the adhesion of the second reinforcement.

Furthermore, PETG has properties that are similar to those of PVC. It is in particular easily thermoformable which makes it easier to assemble the layers constituting the multilayer when layers C and D are respectively made of PETG and PVC. In this way the total mass of the multilayer is reduced.

With reference now to the figures, the following three multilayers were prepared:

CE-1: standard product: multilayer comprising a reinforcing layer containing reinforcing fibers. This multilayer is composed of:
a reinforcing composite layer made of polyester reinforced with fiberglass that is 540 g/m² and 0.35 mm thick;
an adhesive layer made of TPU that is 90 g/m² and 0.08 mm thick;
two surface layers made of PVC that are each 0.55 mm thick and each have a surface density of 655 g/m².

CE-2: standard product: multilayer comprising two reinforcing layers containing reinforcing fibers. This multilayer is composed of:
a reinforcing composite layer made of polyester reinforced with fiberglass that is 540 g/m² and 0.35 mm thick;
a TPU adhesive 90 g/m² and 0.08 mm thick;
a second reinforcing layer composed of fiberglass that is 220 g/m² and 0.20 mm thick;
a second adhesive layer that is 50 g/m² and 0.03 mm thick;
two surface layers made of PVC that are each 0.50 mm thick and each have a surface density of 570 g/m².

INV-1: multilayer comprising a reinforcing fiber layer (A) and a reinforcing layer free of reinforcing fibers (D). This multilayer (FIG. 1) is composed of:
a layer A made of fiberglass reinforced polyester that is 540 g/m² and 0.33 mm thick;
a layer B made of TPU that is 90 g/m² and 0.08 mm thick;
a layer C made of PVC that is 740 g/m² and 0.42 mm thick;
a layer D made of PETG that is 170 g/m² and 0.13 mm thick;
a layer E made of TPU that is 360 g/m² and 0.30 mm thick;

INV-2: multilayer comprising a reinforcing fiber layer (A) and a reinforcing layer free of reinforcing fibers (D). This multilayer is composed of:
a layer A made of fiberglass reinforced phenolic resin that is 470 g/m² and 0.30 mm thick;
a layer B made of copolyamide (CoPA) adhesive that is 50 g/m² and 0.05 mm thick;
a layer C made of PVC that is 740 g/m² and 0.42 mm thick;
a layer D made of PETG that is 170 g/m² and 0.13 mm thick;
a layer E made of TPU that is 360 g/m² and 0.30 mm thick;

The thickness of the multilayer does not necessarily correspond to the sum of the thicknesses of the layers because of the joining and post-treatment steps: pressing and possible graining.

TABLE 1 composition and properties of the three multilayers prepared

| | surface density of the multilayer (g/m²) | thickness of the multilayer (mm) | rigidity parameter $Ef \cdot h^3$ (MPa) |
|---|---|---|---|
| CE-1 | 1940 | 1.55 | L: 615/T: 570 |
| CE-2 | 2040 | 1.65 | L: 2020/T: 1960 |
| INV-1 | 1900 | 1.40 | L: 2670/T: 2180 |
| INV-2 | 1800 | 1.30 | L: 2373/T: 1705 |

INV multilayer
CE Comparison example
L: bending parameter along the long axis
T: bending parameter along the transverse axis The bending parameters in the long axis and in the transverse axis are different because of the presence of reinforcing fibers.

Figure 2:
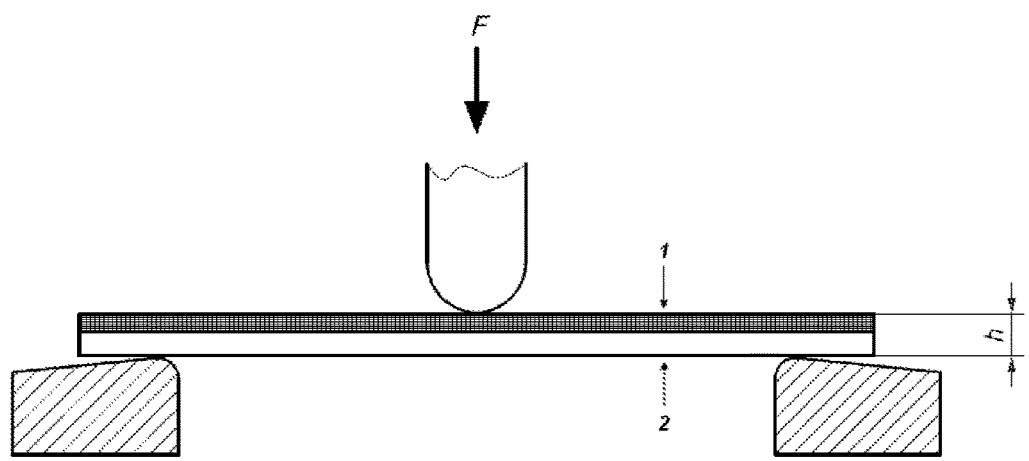
FIG. 2 represents the test with which to measure the bending parameters of the multilayer in accordance with the present disclosure.

The bending parameters are measured according to conventional techniques known to the person skilled in the art and defined by the ISO 178 standard. It involves the three-point bending test by positioning the multilayer with the lower side of the product positioned facing upward (side 1) and the surface of the product positioned facing downward (side 2; see FIG. 2). The measurement conditions conform to the criteria in the ISO 178 standard with, as additions and restrictions, the dimensions of the test sample being 100 mm×25 mm, the parameter h corresponding to the thickness of the multilayer and the test speed at 1 mm/min.

The measured bending parameter (in N/mm) showing the stiffness of the product, $Ef \times h^3$, depends upon the bending modulus of elasticity Ef and the thickness h of the sample.

In general, a parameter, $Ef \times h^3$, of over 1,500 N/mm has sufficient stiffness properties for an application in aeronautics.

Table 1 shows that the multilayers INV-1 and INV-2 have a bending parameter greater than the multilayers comprising CE-1 and CE-2 which comprise respectively a single reinforcing fiber and two reinforcing fibers. Furthermore, the surface density of the INV-1 and INV-2 multilayers is less than that of CE-1 and CE-2.

These examples illustrate the advantages provided by the embodiments disclosed herein, specifically rigidity conforming to industrial standards and lower surface density.

What is claimed is:

1. A multilayer floor covering comprising:
a layer A of reinforcing fibers, the layer A made of (i) polyester or phenolic resin and (ii) fiberglass;
an adhesive layer B;
an underside layer C;
a reinforcing layer D, free of reinforcing fibers, the layer D made of PETG and/or PET;
a surface layer E.

2. The multilayer floor covering according to claim 1, wherein reinforcing layer D has a thickness ranging from between 0.07 mm and 0.40 mm.

3. The multilayer floor covering according to claim 1, wherein layer A comprises, by weight relative to the weight of layer A:
   20 to 80% reinforcing fibers;
   80 to 20% polymer resin.

4. The multilayer floor covering according to claim 1, wherein layer C is a polymer selected from the group consisting of: polyvinylchloride, ethylene-vinyl acetate copolymer and mixtures thereof.

5. The multilayer floor covering according to claim 1, wherein layer D comprises a printed pattern on the side thereof facing layer E.

6. The multilayer floor covering according to claim 1, wherein layer E comprises a printed pattern on the side thereof facing layer D.

7. The multilayer floor covering according to claim 1, wherein layer E comprises a polymer chosen from the group consisting of: thermoplastic polyurethane, poly(vinylchloride) and mixtures thereof.

8. The multilayer floor covering according to claim 1, further comprising at least one of the following layers:
   a layer A made of polyester and fiberglass;
   an adhesive layer B made of thermoplastic polyurethane;
   a layer C made of PVC;
   a layer E made of thermoplastic polyurethane.

9. The multilayer floor covering according to claim 1, further comprising at least one of the following layers:
   a layer A made of phenolic resin and fiberglass;
   an adhesive layer B made of copolyamide;
   a layer C made of PVC;
   a layer E made of thermoplastic polyurethane.

10. The multilayer floor covering according to claim 1, wherein the multilayer floor covering has a thickness less than 3.7 mm.

11. The multilayer floor covering according to claim 1, wherein the multilayer floor covering has a surface density less than or equal to 2.3 kg/m$^2$.

12. The multilayer floor covering according to claim 1, wherein reinforcing layer D has a thickness ranging from between 0.07 mm and 0.40 mm, and a surface density ranging from between 50 and 500 g/m$^2$.

13. The multilayer floor covering according to claim 1, further comprising at least one of the following layers:
   a layer A made of polyester and fiberglass;
   an adhesive layer B made of thermoplastic polyurethane;
   a layer C made of PVC comprising at least some fillers and/or at least one flame retardant agent;
   a layer E made of thermoplastic polyurethane comprising at least one flame retardant agent.

14. The multilayer floor covering according to claim 1, further comprising at least one of the following layers:
   a layer A made of phenolic resin and fiberglass;
   an adhesive layer B made of copolyamide;
   a layer C made of PVC comprising at least some fillers and/or at least one flame retardant agent;
   a layer E made of thermoplastic polyurethane comprising at least one flame retardant agent.

15. The multilayer floor covering according to claim 1, wherein the reinforcing layer D comprises polymers with a bending modulus of elasticity between 1500 and 3500 MPa according to the ISO 178 standard.

16. The multilayer floor covering according to claim 1, wherein the reinforcing layer D comprises polymers with a bending modulus of elasticity between 2000 and 3200 MPa according to the ISO 178 standard.

17. A method for production of the multilayer floor covering that is the subject of claim 1, comprising the following steps:
   production of layers A to E;
   assembly of layers A to E.

* * * * *